United States Patent [19]

Ramge

[11] 3,779,730

[45] Dec. 18, 1973

[54] CONTROL FOR GLASS MARBLE, FEEDING, MELTING, AND FIBER FORMING UNIT

[75] Inventor: Dennis Lee Ramge, Waterville, Ohio

[73] Assignee: Johns-Manville Corporation, New York, N.Y.

[22] Filed: Jan. 27, 1972

[21] Appl. No.: 221,314

[52] U.S. Cl............................. 65/9, 65/158, 65/162, 65/335
[51] Int. Cl.......................... C03c 3/00, C03c 37/00
[58] Field of Search..................... 65/162, 163, 164, 65/158, 335, 9

[56] References Cited
UNITED STATES PATENTS
3,573,017  3/1971  Griem, Jr........................... 65/162 X
3,134,145  5/1964  Miller................................. 19/155

*Primary Examiner*—Arthur D. Kellogg
*Attorney*—John A. McKinney et al.

[57] ABSTRACT

An automatic output control whereby the output of an inorganic thermoplastic material melting and fiber forming unit is controlled by adjusting the amount of heat applied to the melting unit in accordance with a control signal. The control signal is derived by comparing the actual rate of thermoplastic material entering the melting and fiber forming unit with a desired standard.

8 Claims, 2 Drawing Figures

3,779,730

CONTROL FOR GLASS MARBLE, FEEDING, MELTING, AND FIBER FORMING UNIT

SUMMARY OF THE INVENTION

This invention relates to the control of the output quantity of secondary material by determining the rate of input of primary material to the process. More particularly, the invention concerns the production of filaments of inorganic thermoplastic material by automatically controlling the output from melting and fiber forming units to predetermined levels using the rate of input of uniform discrete increments of material.

The "state of the art" in making a thermoplastic filament product has always recognized the desirability and need for having a constant quantity of heat-softenable material for the rest of the process to work upon. A more consistent and constant quanity is possible when the output is maintained at a predetermined level, not only on a total machine basis, but also on a sequented individual equipment basis. Many of the process problems can be directly related to the individual melting and fiber forming units whose outputs can differ greatly even though the total of their outputs is correct. This difference in individual melter outputs also causes final products with undesirably large tolerance ranges. In order to change the output from a demand feed melter the amount of thermal energy available must be increased or decreased. This will alter the viscosity of the material and thus the output for a given head. In a manual adjustment system a period of cycling will occur in which the product is nonuniform and therefore of poor quality. Such nonuniformity is evidenced in felted wool produced by flame attenuation of primary fibers of glass drawn from a plurality of glass melting and fiber forming pots as a blanket of varying density and/or final fiber diameter across its width wherein low density material and/or fiber diameters finer than desired are formed in the region supplied fibers by a pot having a reduced output while excessive densities and/or fiber diameters greater than desired are formed in the region supplied by a pot having an excessive output.

In the present invention the change in the quantity of heat energy input is automatically controlled to provide the desired output from the glass melting units. This is accomplished by monitoring the rate of input of glass to the melter and generating a correction signal by comparing the input with a predetermined standard.

It is an object of this invention to provide an improved method and apparatus for automatically controlling a fiber forming system to maintain maximum product quality and maximum operating efficiency.

It is another object to provide an improved method and apparatus for continuously melting heat-softenable materials for use in a fiber forming process in which the rate of inorganic thermoplastic material input is used as the measure of the total material flow through a melting unit and the process is controlled accordingly.

It is a further object of this invention to provide an improved method and apparatus for insuring the consistency of a single product made from several material melting and fiber forming units by controlling their individual outputs.

DETAILED DESCRIPTION OF THE PREFERRED EMBODIMENT

Figure 1:
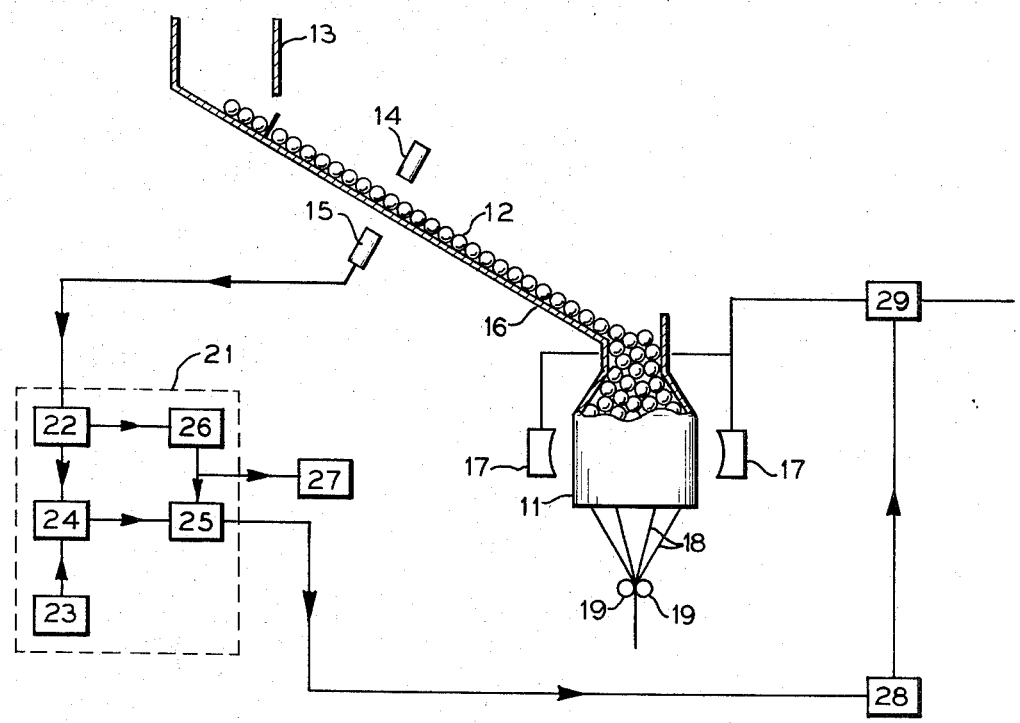
FIG. 1 is a combination block diagram and schematic elevation view of a glass melting and fiber forming unit illustrating the proposed method of control.

FIG. 1 illustrates a typical embodiment in a glass process. A glass melting unit 11 receives glass marbles 12 from a hopper 13 where they are stored. The glass marbles 12 either drop or roll past a sensor, in the example an energy source 14 and detector 15 such as a light beam and photoelectric cell. The passing marbles modulate the output of the detector and continue into an inclined chute 16 which directs them into the upper end of the melting unit. The melting unit accepts the marbles on a supply demand basis. As the marbles melt, a demand is put on the chute for more marbles and the supply hopper then must release the quantity required to keep the chute full. A source of high-temperature thermal energy such as burners 17 heats and softens marbles within the melting unit 11 until the viscosity of the softened glass is such that the glass can be extruded from the melting unit in the form of primary fibers 18 which are conditioned by pulling rolls 19. The primary fibers 18 can be formed into secondary fibers as by softening and attenuating them with an attenuation burner, and collecting the fibers on a collecting apparatus such as a moving conveyor as will be discussed generally with respect to FIG. 2.

The modulated output from the detector 15 is a succession of pulses which may be random, one pulse for each increment of glass which is passed to the melting unit 11. This output is supplied to a control unit 21. The pulses are summed by a count accumulator 22 over a fixed period of time with an output proportional to the number of counts received. Also within the control unit is an input count set point 23 which permits the setting of the number of marbles desired in the fixed period of time. The output from the count accumulator and the input count set point are sent to a comparator 24 where a plus or minus error signal is generated. This error signal then passes through a normally closed relay 25 as an output signal.

A condition may occur where the detector does not issue a count for a specified period of time resulting from either the continued presence or absence of a marble between source 14 and detector 15 as where a jam of marbles occurs in chute 16 or hopper 13. The marble jam alarm 26 senses this condition and opens normally closed relay 25 so that the error signal cannot pass. At the same time the marble jam alarm actuates an alarm indicator 27 to alert the operating personnel. After the trouble is corrected the marble jam alarm is reset and the normally closed relay allows the error signal to pass. Since a jam may clear after an alarm condition is established, the count accumulator is arranged to continue monitoring the input to the melter unit so that, upon reset, the accumulated data is available for control.

The error signal is received by attenuator 28 which passes only a fraction of the total signal. Attenuator 28 may take the form of a normally open interrupt timer which cycles with a pattern that allows the error signal to pass for a set period of time during each cycle. As an example, the interrupt timer might pass the signal for one second every minute. The attenuated error signal is then used to control an adjustable source of thermal energy such as adjustable gas valve 29 which regulates the quantity of air-gas mixture flowing to burners 17 thereby controlling the melting rate. The attenuator is used to prevent overshoot which would cause undersirable oscillations each time the rate of input of marbles changed.

Since the set point represents the desired feed, a plus error represents a feed rate greater than the set point and dictates a reduced melting rate and thus a reduced input of thermal energy to the melting unit. Accordingly, a plus error reduces the rate of input of the combustible mixture to burners 17 and a minus error increases that rate in the example.

Overshoot of the thermal energy input and hunting of the control as a result of such overshoot is reduced beyond that achieved by the effect of the attenuator 28 by providing the control with a dead band. Such a dead band can be introduced in the comparator 24 by preventing it from issuing an error signal when the count accumulator signal is within a given range of the set point. Alternatively, the dead band can be introduced by rendering the control of the thermal energy supply non responsive to error signals below a given level. In either instance, the dead band should be of adjustable width and should be adjustable around the set point.

By determining the average weight of the marbles entering the system the input count set point 23 can be adjusted to provide a desired weight of glass per hour. The control unit then will provide information to the system to enable it to adjust the thermal energy input and thus the melting rate so that the melting unit 11 will accept, melt and issue the desired weight of glass per hour.

This system may be used advantageously where a number of material melting and fiber forming units are combined to produce a single product. For example, by controlling the output of each unit in an insulation blanket forming process a mat of uniform density and/or fiber diameter can be produced. Further, changes of product from a given machine can be accomplished more effectively than in the past since predetermined set points can be established for each melter-fiber former pot and the controls will expeditiously establish uniform output across the width of the machine by individually adjusting each pot in accordance with the rate at which the essentially equal sized glass increments (marbles) are fed to the pot to control the amount of heat applied to said unit by its respective heating means whereby the rate at which fiber is deposited in said receiving apparatus at locations across said apparatus is adjustable.

Figure 2:
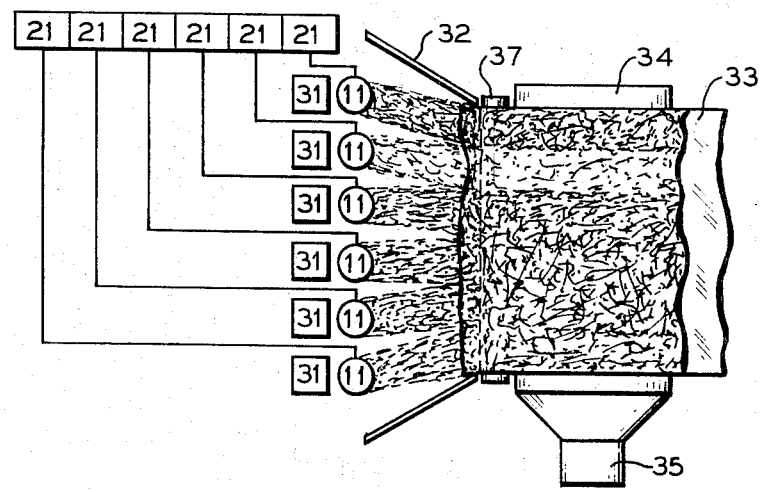
FIG. 2 is a schematic plan view of a machine for forming felted glass blanket by flame attenuation of primary filaments from a plurality of glass melting and fiber forming units each controlled according to FIG. 1, and illustrating in an exaggerated manner the effect of operating one unit of a group at an output different from the uniform output of the remaining units as it reflects upon the blanket density and/or fiber diameter.

FIG. 2 illustrates a particularly advantageous use of a plurality of the melter-fiber forming units disclosed in FIG. 1 to improve the control of material distribution across the width of a felted blanket of glass fiber. Conventionally, a plurality of pots 11 in which glass marbles are melted and from which primary fibers are drawn are arrayed transverse of a line along which attenuated fibers are formed into a blanket. Attenuation burners 31 are associated with each pot to soften, attenuate and entrain the attenuated fibers in a blast of gas and fiber confined and directed into a collection hood 32 which collects the fibers over a collecting chain 33 having behind its collecting face a suction box 34 from which gas is withdrawn by blower 35. The screen is trained over end rolls 37 and is endless. Its delivery end from which the collected blanket of glass is removed is not shown.

In operation the burner blasts pass beneath the pull rolls 19 below each pot and in general tend to carry the attenuated secondary fibers from their respective pots along a path aligned with the respective pot and primary filaments depending therefrom. Accordingly, while some displacement of fibers transverse of the line of travel from the fiber formers will occur there is a stratification of the preponderance of fibers from individual fiber formers as laid down in a blanket on the collecting chain 33 downstream of the fiber formers. This stratification of fibers is illustrated in FIG. 2 as a low density band issuing from the second unit 11 and can result in an unsatisfactory product where uniformity is desired and where the fiber formers of the array are not issuing uniform amounts of glass as primary fibers to the burners. Thus, where a uniform density and diameter of fiber across the width of the fiber receiving apparatus, the collecting chain 33, is desired, each of the fiber formers should issue fiber at a uniform rate. Usually it is desired that they all issue fibers at a uniform rate. However, there can be instances where controlled density and/or diameter of the fibers felted into the blanket in strips of different fiber density and/or diameter across the width of the collecting chain is desirable and the fiber formers disposed across the array can be adjusted to issue fibers at different rates to provide these controlled variations.

The individual control of the heat input as established by an adjustable set point or reference signal is therefore used to advantage for each of a plurality of melter-fiber former units in producing an end product of controlled characteristics composed of a combination of the fibers produced by the individual units at a point in the production at which control was not available heretofore.

The adjustment of the input of thermal energy in response to the rate of input of the material to be melted can be contolled over a range for a given melting unit to adjust the diameter of the primary filaments issuing from the unit. The diameter of the primary filaments is a function of the throughput in the case of glass since those filaments are issued at essentially the same velocity for all throughputs in the usual operating range of a unit. However, secondary fiber diameter can be controlled by control of the operating parameters of the attenuating means. In the case of attenuating burners a higher velocity output reduces secondary fiber diameter. Thus, when attenuating control is combined with the throughput control discussed above, secondary fiber density can be controlled while secondary fiber diameter is controlled to increase or decrease density with a constant fiber diameter, to alter density while altering fiber diameter, or to maintain density while altering fiber diameter.

It is to be understood that the present control system for melter-fiber former units is adaptable to materials other than glass and to feed increments other than uniformly sized marbles of glass. Further the various elements including heat sources for the melting units, detectors, set point controls, signal comparing means and attenuators are available in many forms. Accordingly, the above disclosure is to be read as illustrative of the invention and not in a limiting sense.

I claim:

1. A fiber forming apparatus wherein glass marbles are fed into a fiber forming unit comprising:
   a. heating means for heating the unit to melt the marbles,
   b. conveying means for conveying the marbles from a source to said fiber forming unit with the rate of feed of the marbles into said unit being regulated by the rate at which the marbles are melted in said unit, and
   c. control means comprising means for counting the marbles during passage of said marbles from said source to said unit on said conveying means and for generating a control signal which is a function of the number of the marbles counted, reference signal means for producing a reference signal characteristic of a given rate of passage, said means for producing a reference signal being adjustable to enable selection of a desired rate for comparison with said control signal, comparator means for comparing said reference signal with said control signal and for issuing an error signal which is proportional to the difference between said control signal and said reference signal, and means responsive to said error signal for controlling said heating means to regulate the heat input to said fiber forming unit.

2. An apparatus as defined in claim 1 in which said means for counting the marbles comprises a radiant energy source and detector positioned on opposite sides of said conveying means and arranged to generate a pulse for each marble which passes along said conveying means.

3. An apparatus as defined in claim 1 including indicator means responsive to a signal characteristic of the absence of the passage of marbles through said conveying means at at least a certain rate.

4. An apparatus as defined in claim 3 wherein said indicator means responsive to the absence of the passage of marbles at at least a certain rate is responsive to a stoppage of the passage of the marbles.

5. An apparatus as defined in claim 1 in which said means to generate an error signal includes means to attenuate said error signal.

6. An apparatus as defined in claim 1 including means responsive to a signal characteristic of the absence of the passage of marbles through said conveyance means at at least a certain rate to prevent the response to said error signal of said means for controlling said heating means.

7. An apparatus as defined in claim 1 comprising a plurality of said fiber forming units each unit having one of said heating means, one of said conveying means and one of said control means.

8. An apparatus as defined in claim 7 wherein:
   a. fiber collecting means is provided to receive fiber from said fiber forming units, and
   b. said fiber forming units are disposed across a width of said fiber collecting means whereby the output of said fiber forming units can be regulated by said control means to regulate the amount of fibers deposited on said collecting means in regions located across the width of the fiber collecting means.

* * * * *